Oct. 1, 1968
W. J. STINSON
3,403,611
FOLDABLE CAMERA SUPPORT FOR ACTION PHOTOS OF BOWLERS
Filed Oct. 22, 1965
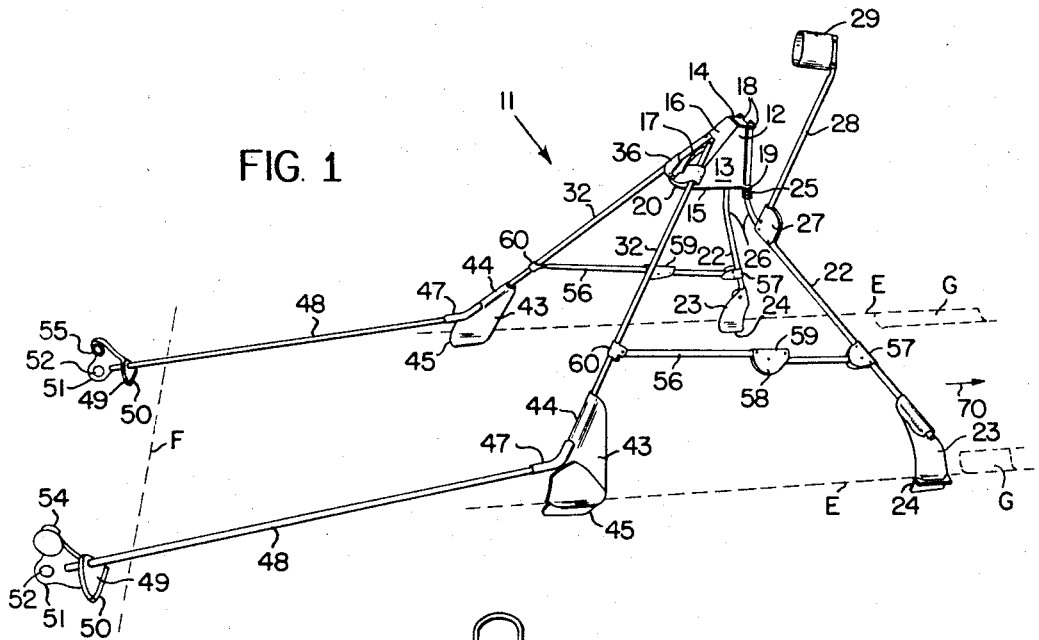
FIG. 1
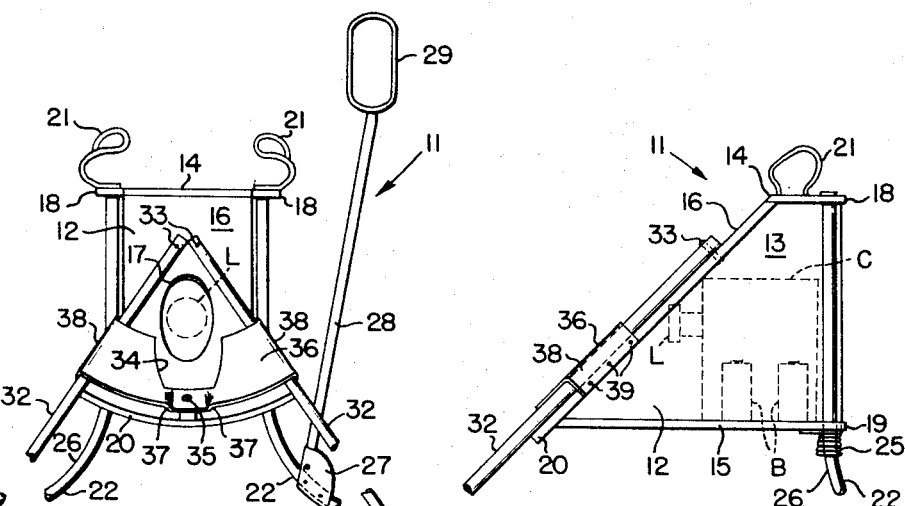
FIG. 2
FIG. 3
INVENTOR.
WILLIAM J. STINSON
BY *B.E. Schlesinger*
ATTORNEY

United States Patent Office

3,403,611
Patented Oct. 1, 1968

3,403,611
FOLDABLE CAMERA SUPPORT FOR ACTION
PHOTOS OF BOWLERS
William J. Stinson, 162 Long Meadow Circle,
Pittsford, N.Y. 14534
Filed Oct. 22, 1965, Ser. No. 502,136
15 Claims. (Cl. 95—11.5)

ABSTRACT OF THE DISCLOSURE

The camera support has two forward and two rear legs for holding a camera so that it faces a bowler as he delivers a ball onto the bowling alley. Both sets of legs straddle the alley; and they have flanged feet, which slidably engage the gutter ridges at opposite sides of the alley to guide the stand for sliding movement into and out of its operative position. The stand is pushed into position or removed therefrom by a pair of rods, which are foldably connected to the forward legs of the support, and which seat forward of the foul line at opposite sides of the alley when the stand is erected. A light source and photoelectric cell on these rods are connected to trigger the camera, when the beam of light from the source is interrupted by a ball just as it is discharged by a bowler down the alley. The rods can be used to draw the support off the alley without walking on the latter; and the legs and rods are collapsible when the support is not in use.

---

This invention relates to foldable camera supports, and more particularly to a camera stand or support particularly for use in taking action photos of bowlers.

For personal records and to show the bowler how he or she delivers a bowling ball down an alley or bowling lane, it is desirable to take action photographs of a bowler head-on. To do so, the camera must be located at some point down the lane, and preferably directly over the center of the lane, with its lens facing the bowler. Usually people are not permitted to walk on the bowling alley to take such a photo; and even if they were permitted to do so, they would be in the way of the bowling ball. Conventional camera tripods are no solution to the problem, because one would still have to walk out onto the alley in order to set up a tripod, and even then, the tripod legs would tend to damage the surface of the alley, and would be in the path of the bowling ball.

An object of this invention is to provide a foldable camera stand or support for taking head-on action photographs of bowlers.

Another object of this invention is to provide a foldable camera support of the type described, which is easy to carry and to store, and which may be easily mounted in a bowling alley, or dismounted in a matter of seconds.

A further object of this invention is to provide a foldable camera support of the type described, which can be used to actuate automatically a camera at the instant of delivery of the ball onto the alley.

Other objects of the invention will be apparent hereinafter from the specification and from the recital of the appended claims, particularly when read in conjunction with the accompanying drawing.

In the drawing:

FIG. 1 is a perspective view of a foldable camera stand or support made in accordance with one embodiment of this invention, the stand being shown as it looks when it is mounted in a bowling alley in position to take an action photo of a bowler;

FIG. 2 is a fragmentary front elevational view of this stand, and illustrating the front of a camera housing which forms part of the stand, and FIG. 3 is a fragmentary side elevational view of this stand and its camera housing.

Referring now to the drawing by numerals of reference, the foldable camera stand 11 comprises a hollow camera housing 12 having spaced, parallel sidewalls 13 (only one of which is illustrated in FIGS. 1 and 3), spaced, parallel upper and lower walls 14 and 15, respectively, and an inclined front wall 16. The back of the housing is open to permit the insertion of a camera C (broken lines in FIGS. 2 and 3) into the housing, so that the lens L of the camera registers with an opening 17 that is formed in the front housing wall 16. Both the upper and lower walls 14 and 15 have integral projections 18 and 19, respectively, which project beyond opposite sides of the housing 12 at the rear thereof. The front wall 16 has an arcuate lower edge 20, which extends below the bottom wall 15 and slightly beyond the housing sidewalls 13.

Secured to the top of the camera housing 12 at opposite sides, respectively, thereof, and curving upwardly and inwardly toward one another over the top of the housing are two spaced, flexible wire clamps 21, the purpose of which will be described in more detail below. For reasons of clarity, these clamps are illustrated only in FIGS. 2 and 3.

Pivotally mounted adjacent their upper ends in the projections 18 and 19 at opposite sides of the housing 12 are identical, rear support legs 22. Intermediate its ends each leg 22 has a slight bend 26. Above the bends 26 the legs 22 have straight, parallel portions, which are journaled in the projections 18 and 19; and below the bends 26, these legs have straight portions which diverge outwardly and rearwardly of housing 12, when the stand is erected as shown in FIG. 1. Each leg 22 is a rigid, relatively light-weight tubular member, and has secured to the lower end thereof a sheet metal foot 23 which terminates in an L-shaped flange 24. Surrounding each leg 22 adjacent its associated projection 19 is a coiled torsion spring 25, one end of which is secured to housing 12, and the opposite end of which is secured to the leg 22. These springs 25 tend to swing the legs 22 toward their erected positions rearwardly of housing 12.

Pivoted at its lower end on a hinge plate 27, which is secured to one of the rear legs 22 beneath its bend 26, is a flash supporting arm 28. At its upper end arm 28 carries a flash and reflector unit 29, which faces in the direction of the bowler, when stand 11 is erected as shown in the drawing. For purposes of clarity, the flash unit 24 and its arm 28 are illustrated only in FIGS. 1 and 2.

Pivotally mounted at 33 adjacent their upper ends on the forward wall 16 of the housing 12 above the opening 17 are identical, tubular, forward support legs 32.

The legs 32 are adapted to be swung toward and from one another in a guide groove formed between the front wall 16 of the camera housing and an arcuate guide member 36 which is secured medially of its ends by a screw 35 (FIG. 2) to the front wall 16. In its upper edge plate 36 has a notch 34 (FIG. 2), which registers with the opening 17 to prevent the plate from interfering with the camera lens L. At opposite sides of the screw 35, the plate 36 is bent rearwardly toward the wall 16 to form spaced, parallel shoulders 37, which limit the pivotal movement of the legs 32 toward one another. Opposite ends 38 of the plate 36 are bent rearwardly toward and are secured to the sides of housing 12 by screws 39. The inwardly bent ends 38 of plate 36 limit the pivotal movement of legs 32 away from one another.

Secured to the lower end of each forward leg 32 is a sheet metal foot 43 that has a rigid sleeve portion 44 which is secured around the associated support leg 32 and terminates in an L-shaped flange 45. Each leg 32 extends through the sleeve portion 44 of associated foot 43 and is connected by a length of flexible tubing 47 (illustrated only in FIG. 1) to one end of a straight, rigid tubular rod 48 which acts as a pusher. Secured to the opposite end of each rod 48 is a transverse base plate 49, which has a resilient pad 50 made of nylon or sponge rubber, for instance, secured on its bottom. Projecting forwardly from each plate 49 is a handle portion 51 having an opening 52 therein for grasping it. Mounted in one handle portion 51 is a light source 54, and in the other, a photoelectric cell 55.

Each rear leg 22 is connected to the corresponding front leg 32 by a hinged brace 56, which is pivotally connected at its rear end to a rear leg 22 by a hinge 57, and which is pivotally secured to the corresponding front leg 32 by further hinge member 60. Each brace 56 is hinged intermediate its ends by hinge plate 58, the upper side of which is closed to limit the downward movement of the brace.

In use the camera stand 11 is mounted as illustrated in FIGS. 1 and 2, with the flanged portions 24 and 45 of the feet 23 and 43, respectively, resting upon the ridges E that bound the two gutters at opposite sides of a bowling lane or alley A. The portions 24 and 45 thus function to hold the stand 11 against movement laterally of the alley. The two plates 49 rest adjacent opposite sides, respectively, of the alley against the ends of the ridges E adjacent the foul line F. This set-up positions the camera housing 12 beneath the flash unit 29, and over the center of the alley at a point spaced down the alley from the foul line F the proper focal distance for taking a good picture of the bowler as the ball is delivered onto the alley.

The wires from light source 54 and its photoelectric cell 55 extend through the tubular members 48, 47 and 32 to a power source, such as dry-cell batteries B (broken lines in FIG. 3), and to a camera actuating solenoid (not illustrated), that are mounted in housing 12.

At the moment the bowler releases the bowling ball, his or her hand, or, more usually, the bowling ball itself cuts the ray of light which extends from the light source 54 to the photoelectric cell 55. This causes the photoelectric cell to close an electrical circuit, which energizes the solenoid that trips the camera shutter. The flash unit 29 is also connected by conventional means (not illustrated) to the batteries to be energized thereby upon the operation of the solenoid controlling the camera shutter. A head-on action photo of the bowler is thus taken at the moment that he or she releases the bowling ball. If a camera of the type containing a self-developing film pack is employed, the photo will be ready moments after the picture is taken; and if an automatic roll film camera is employed the film will be advanced automatically after each exposure.

To collapse the camera stand 11 to remove it from the alley the operator picks up the handle portions 51 and steps toward the left in FIG. 1, drawing the stand 11 toward him or her. When the front legs 32 reach the foul line, the operator walks toward the stand while raising the rods 48 about the flexible members 47 toward the camera housing 12. Each of the raised members 48 is now lodged beneath one of the clamps 21. The operator then grasps the two front legs 32 and pivots them toward one another about the pins 33 until these legs engage the stops or shoulders 37 on the plate 36. At this point the two legs 32 will be almost parallel to one another; and the rear legs 22 will have been swung slightly forwardly against the resistance of the springs 25 by the not-as-yet collapsed braces 56. Thereafter the arm 28 supporting the flash unit 29 is swung manually downwardly about its hinge plate 27; and the braces 56 are grasped and lifted slightly to fold them. As the braces pivot upwardly, the rear legs 22 swing forwardly until the feet 23 thereof engage the feet 43 of the already collapsed forward legs 32. The stand 11 is now completely collapsed, and thus forms a compact and easily portable unit.

To mount the stand 11 on an alley, and while standing behind the foul line F (to the left of the foul line as illustrated in FIG. 1), the two forward legs 32 are grasped and spread away from one another to the extent permitted by the plate 36. During this movement the springs 25 swing the rear legs 22 to their erected positions. The braces 56 drop into horizontal position and lock the frame open. The stand 11 is then placed over the alley adjacent the foul line F with the flange portions 24 and 45 of the feet 23 and 43 resting on the alley ridges E. The operator then grasps the handle portions 51, disengages them from beneath the clamps 21, and steps backward to bring the handles downward to a convenient height for pushing the stand out onto the alley; and the unit is pushed onto the alley to the position illustrated in FIG. 1. It guides itself by its feet 23, 43 riding on the alley ridges. The operator then places the handles 51 on the floor with the base sections 49 butting against the ends of the ridges, and the device is automatically aligned with the foul line in position to take a picture.

A conveniently located switch (not illustrated) is then closed to energize the light source, which projects its beam on the photocell. The apparatus is now set up and ready to take a picture as above described.

From the foregoing it will be apparent that applicant has devised a comparatively simple, inexpensive, and highly compact camera support for taking action photos of bowlers. With applicant's device the operator, or photographer, never has to walk out onto the alley proper. Upon being erected the stand 11 locks its legs 22 and 32 automatically in position. Moreover, when the support is erected, the legs 32 always intersect one another at the same angle, thereby assuring that the lens of the camera C in the housing 12 will always be properly directed at the bowler.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. A foldable camera stand for holding a camera in position to make action pictures of bowlers, comprising:
    (a) a support for a camera,
    (b) a pair of front and a pair of rear legs hingedly connected to said support and spaced from one another and adapted when opened to straddle a bowling alley,
    (c) two members carried by the two front legs, respectively, to extend forwardly of the front legs when opened,
    (d) a light source mounted on one of said members and
    (e) a photoelectric cell mounted on the other of said members and adapted to be connected to a camera mounted on said support to trip the camera when the light beam between said source and said cell is broken.

2. A foldable camera stand as claimed in claim 1, wherein said two members are foldably connected to the two front legs, respectively, to be folded.

3. A foldable camera stand, comprising:
    (a) a camera housing having a wall which is inclined to the horizontal when the stand is erected,
    (b) a pair of front legs and a pair of rear legs for supporting said housing when the stand is erected,
    (c) means pivotally connecting the upper ends of said front legs to said housing for pivotal movement in a plane parallel to said wall between operative and inoperative positions, respectively, about a first pair of spaced, parallel axes, which extend at right angles to said wall, and (d) means pivotally connecting the upper ends of the rear legs to said housing for rotational movement between operative and inoperative positions, respectively, about a second pair of spaced parallel axes which are inclined to said first pair of axes, and which are disposed substantially vertically when said stand is erected.

4. A foldable camera stand as defined in claim 3, wherein
(a) a foot is secured to the lower end of each of said legs to support the stand above a bowling alley and between the alley gutters, and
(b) each of said feet has formed thereon a right-angular flange, one part of said flange seating on a gutter ridge of the alley and the other part of said flange seating in the adjacent gutter of the alley, and the flanges on said front legs are disposed to face downwardly and away from one another, and to be in spaced parallel alignment with the flanges on said rear legs, when said stand is erected.

5. A foldable camera stand as defined in claim 3, including
(a) a pair of rigid rods,
(b) flexible means connecting said rods at one end thereof to the lower ends of said front legs for swinging movement toward and away from said housing, between erected positions in which said rods extend forward of the lower ends of said front legs and collapsed positions in which said rods overlie said front legs, and
(d) clamping means on said housing releasably engageable with said rods to hold said rods releasably in collapsed positions against said housing.

6. A foldable camera stand for supporting a camera over a bowling alley, comprising:
(a) a camera housing having a wall which is inclined to the horizontal, when the stand is erected,
(b) a pair of front legs pivoted at their upper ends on said wall to swing toward and away from one another in a plane parallel to said wall between folded, inoperative positions and open, operative positions, respectively,
(c) a pair of rear legs mounted at their upper ends on said housing to rotate between operative and inoperative positions, about a pair of spaced parallel axes, which are inclined to the pivotal axes of said front pair of legs, and which are disposed substantially vertically when said stand is erected,
(d) a right-angular flange mounted on the lower end of each of said legs to have one right angular portion thereof disposed horizontally, and seated on a gutter ridge of the alley, when the stand is erected, the other right angular portion extending downwardly and seated against the outside wall of said gutter of the alley, and
(e) means operative upon the movement of said legs to their operative positions to lock said legs releasably against movement relative to one another, with the flanges on said front pair of legs disposed in spaced parallel relation to one another, and in spaced alignment, respectively, longitudinally of the alley, with the flanges on said rear pair of legs.

7. A foldable camera stand as defined in claim 6, wherein:
(a) said front legs are straight and rigid,
(b) said rear legs are rigid and bent intermediate their ends, and have spaced, upper portions which are disposed vertically when the stand is erected, and lower portions, which diverge outwardly and rearwardly away from said front legs, when the legs are opened, and which extend beneath said housing, when the legs are folded.

8. A folded camera stand as defined in claim 6, wherein the last-named means comprises:
(a) stop means on said wall engageable with said front legs, when they are in their operative positions, to prevent further movement of said front legs away from one another, and
(b) a pair of collapsible braces connecting said front legs to said rear legs and movable to horizontal positions between said front and rear legs when the stand is erected, thereby to hold said legs against movement relative to said housing.

9. A foldable camera stand as defined in claim 8, wherein said stop means comprises a plate secured to said wall, and having portions intermediate its ends extending parallel to said wall and overlying said upper ends of said front legs to guide the latter for swinging movement across the face of said wall, and having further portions at opposite ends thereof, respectively, extending transverse to said wall to engage and stop said front legs upon movement thereof to their open positions.

10. A foldable camera stand comprising:
(a) a camera housing having a wall which is inclined to the horizontal, when the stand is erected,
(b) a pair of front legs pivoted at their upper ends on said wall to swing toward and away from one another in a plane parallel to said wall between folded, inoperative positions and open, operative position, respectively,
(c) a pair of rear legs mounted at their upper ends on said housing to pivot between operative and inoperative positions, about a pair of spaced, parallel axes, which are inclined to the pivotal axes of said front pair of legs,
(d) a right-angular flange mounted on the lower end of each of said legs,
(e) means operative upon the movement of said legs to their operative positions to lock said legs releasably against movement relative to one another, with the flanges on said front pair of legs disposed in spaced parallel relation to one another, and in spaced alignment, respectively, with the flanges on said rear pair of legs,
(f) the last-named means comprising stop means on said wall engageable with said front legs, when they are in their operative positions, to prevent further movement of said front legs away from one another,
(g) a collapsible brace connecting each of said front legs to one of said rear legs, and
(h) resilient means interposed between said rear legs and said housing, and constantly urging said rear legs toward their open positions.

11. A foldable camera stand comprising:
(a) a camera housing having a wall which is inclined to the horizontal, when the stand is erected,
(b) a pair of front legs pivoted at their upper ends on said wall to swing toward and away from one another in a plane parallel to said wall between folded, inoperative positions and open, operative positions, respectively,
(c) a pair of rear legs mounted at their upper ends on said housing to rotate between operative and inoperative positions, about a pair of spaced, parallel axes, which are inclined to the pivotal axes of said front pair of legs,
(d) a right-angular flange mounted on the lower end of each of said legs,
(e) means operative upon the movement of said legs to their operative positions to lock said legs releasably against movement relative to one another, with the flanges on said front pair of legs disposed in spaced, parallel relation to one another, and in spaced alignment, respectively, with the flanges on said rear pair of legs,
(f) a pair of elongate, rigid pusher members connected at one end thereof to the lower ends of said front legs, (g) a flexible member interposed between said one end of each of said pusher members, and the front leg associated therewith, to permit the opposite ends of said members to be swung toward and away from said housing, and (h) means for releasably holding said opposite ends of each of said members against said housing.

12. A foldable camera stand as claimed in claim 11, wherein one of said pusher members carries at its said opposite end a light source, and the other pusher member carries at its said opposite end a photoelectric cell which is operatively connectable to a camera mounted in said housing to trip said camera when the light beam between the light source and the photoelectric cell is broken.

13. A camera stand for holding a camera to take automatically action pictures of bowlers, comprising as a unit, (a) a holder for a camera, (b) foldable front and rear legs on said holder adapted, when erected, to straddle a bowling alley for supporting said holder with the camera above and between the sides of the alley and directed forwardly toward the foul line of the alley, (c) a pair of rods pivotally connected to said front legs and manually operable to slide the holder and said legs, when erected, down a bowling alley to space the camera holder from the foul line of the alley, and (d) means carried by said rods, and supported thereby adjacent the foul line of the alley, when the stand is erected, for automatically actuating the camera when the bowler delivers a ball down the alley beneath the erected stand.

14. A camera stand as claimed in claim 13, wherein the last-named means includes a light source mounted on one of said rods and a photoelectric cell carried by the other of said rods to register with said light source.

15. A camera stand as claimed in claim 13 including a flash unit on one of said legs for operation simultaneously with said actuating means.

References Cited

UNITED STATES PATENTS

| | | | |
|---|---|---|---|
| 937,612 | 10/1909 | Kircher | 248—169 |
| 2,409,622 | 10/1946 | Gottfried | 248—188.9 |
| 2,653,507 | 9/1953 | Riles et al. | 95—86 XR |
| 2,684,822 | 7/1954 | Odin | 95—86 XR |
| 3,016,812 | 1/1962 | Chatlain | 95—11 |
| 3,173,348 | 3/1965 | Betinis | 95—11 |

NORTON ANSHER, *Primary Examiner.*

FRED L. BRAUN, *Assistant Examiner.*